United States Patent
Shimizu

(10) Patent No.: US 7,701,089 B2
(45) Date of Patent: Apr. 20, 2010

(54) POWER SUPPLY CIRCUIT

(75) Inventor: Shinya Shimizu, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 95 days.

(21) Appl. No.: 11/493,390

(22) Filed: Jul. 26, 2006

(65) Prior Publication Data

US 2007/0035183 A1 Feb. 15, 2007

(30) Foreign Application Priority Data

Aug. 12, 2005 (JP) ............................. 2005-234172

(51) Int. Cl.
 *H02J 3/00* (2006.01)
 *H02J 9/00* (2006.01)
(52) U.S. Cl. ........................................ 307/80; 307/150
(58) Field of Classification Search .................... 307/64, 307/150, 80
 See application file for complete search history.

(56) References Cited

U.S. PATENT DOCUMENTS

| | | | | |
|---|---|---|---|---|
| 5,831,350 A | * | 11/1998 | McConkey et al. | ......... 307/150 |
| 6,084,384 A | * | 7/2000 | Kawamoto et al. | .......... 323/269 |
| 6,137,190 A | * | 10/2000 | Gatti | ............................. 307/80 |
| 6,459,175 B1 | * | 10/2002 | Potega | ......................... 307/149 |
| 7,332,896 B2 | * | 2/2008 | Shin et al. | ...................... 307/75 |
| 2004/0217653 A1 | * | 11/2004 | Neidorff | ....................... 307/80 |

FOREIGN PATENT DOCUMENTS

| | | |
|---|---|---|
| JP | 6-12876 | 1/1994 |
| JP | 2003-339125 | 11/2003 |
| JP | 2005-168175 | 6/2005 |

* cited by examiner

*Primary Examiner*—Albert W Paladini
*Assistant Examiner*—Michael Rutland Wallis
(74) *Attorney, Agent, or Firm*—Cooper & Dunham LLP

(57) ABSTRACT

A power supply circuit is disclosed that includes a first power supply for supplying first power to a load, a first constant voltage circuit part for changing the voltage input from the first power supply to a first constant voltage and outputting the first constant voltage to the load, a first switch part for controlling the input of the first constant voltage to the load, a second power supply for supplying second power to the load, a second constant voltage circuit part for changing the voltage input from the second power supply to a second constant voltage and outputting the second constant voltage to the load, and a second switch part for controlling the input of the second constant voltage to the load.

14 Claims, 4 Drawing Sheets

FIG.2

|  |  | INPUT CONDITIONS OF CONTROL CIRCUIT | | | |
|---|---|---|---|---|---|
|  |  | A | B | C | D |
| INPUT | Vi1(V1) | 3.75V OR MORE (TRUE) | LESS THAN 3.75V (FALSE) | LESS THAN 3.75V (FALSE) | |
|  | Vo1(V2) | 2.5V OR MORE (TRUE) | LESS THAN 2.5V (FALSE) | LESS THAN 2.5V (FALSE) | |
|  | Vi2(V3) | — | 3.2V OR MORE (TRUE) | LESS THAN 3.2V (FALSE) | |
|  | Vo2 | — | — | — | |
|  | SLP | L | L | L | H |
| OUTPUT | M1 | ON | OFF | OFF | |
|  | M2 | OFF | ON | OFF | |
|  | SL4 | L | L | H | H |

POWER SUPPLY CIRCUIT

BACKGROUND OF THE INVENTION

1. Technical Field of the Invention

This disclosure relates to a power supply circuit of a mobile phone, and more particularly to a power supply circuit including a power switching circuit that switches between the electric power supplied from a battery installed in a mobile phone and the electric power supplied from an AC adapter.

2. Description of the Related Art

In normal use of a mobile device, electric power is supplied to an electronic circuit from a battery installed inside the mobile device. In an environment where commercial electricity is available, an AC adapter may be connected to the mobile device for the purpose of reducing the discharge of the battery or for the purpose of charging the battery in a case where the installed battery is a secondary battery. In the case where the installed battery is a secondary battery, it is preferable to allow the power supply of the AC adapter to charge the secondary battery while supplying power to respective circuits in the mobile device.

FIG. 3 shows an exemplary circuit diagram of a conventional power switching circuit (see, for example, Japanese Registered Patent Publication No. 3195052). The power switching circuit 100 shown in FIG. 3 includes a main power supply 101, a backup power supply 102, a switching control circuit 105, a comparator 106, a reference voltage source 107, PMOS transistors P101, P102, inverters G101, G102, and resistors R101-R103. The power switching circuit 100 includes an output terminal 103, a main power supply terminal Vcc, and a backup power supply terminal VBAT. It is to be noted that Vcc also indicates a main power supply voltage.

The main power supply 101 is connected to the output terminal 103 via the PMOS transistor P101, and the backup power supply 102 is connected to the output terminal 103 via the PMOS transistor P102.

The voltage Vcc of the main power supply 101 is divided by the resistors R101 and R102 that are connected in series. The divided voltage is input to a non-inverting input terminal of the comparator 106. The reference voltage source 107 is connected to an inverting input terminal of the comparator 106. An output terminal of the comparator 106 is connected to an input terminal of the inverter G101, and an output terminal of the inverter G101 is connected to an input terminal of the inverter G102. Furthermore, the output terminal of the inverter G101 is connected to a gate of the PMOS transistor P101, and an output terminal of the inverter G102 is connected to a gate of the PMOS transistor P102.

In a case where the voltage Vcc of the main power supply 101 is sufficiently high, the voltage at the intersecting point between the resistor R101 and the resistor R102 is equal to or greater than the voltage output from the reference voltage source 107. Thereby, the output terminal of the comparator 106 is a high level. In this case, the output terminal of the inverter G101 is a low level, and the PMOS transistor P101 is on. Thereby, the main power supply 101 is connected to the output terminal 103. Meanwhile, the output terminal of the inverter G102 is a high level, and the PMOS transistor P102 is off. Thereby, the backup power supply 102 is not connected to the output terminal 103. Accordingly, only the electric power of the main power supply 101 is supplied to the output terminal 103.

In a case where the voltage Vcc of the main power supply 101 decreases to a level causing the voltage at the intersecting point between the resistor R101 and the resistor R102 to become less than the voltage output from the reference voltage source 107, the signal level of the output terminal of the comparator 106 becomes inverted and becomes a low level. In this case, the output terminal of the inverter G101 becomes a high level, and the PMOS transistor P101 is switched off. Thereby, the main power supply 101 and the output terminal 103 become disconnected. Meanwhile, the output terminal of the inverter G102 becomes a low level, and the PMOS transistor P102 is switched on. Thereby, the backup power supply 102 becomes connected to the output terminal 103. As a result, only the power from the backup power supply 102 is supplied to the output terminal 103.

FIG. 4 is an exemplary circuit diagram showing another power switching circuit (see, for example, Japanese Laid-Open Patent Application No. 2003-339125). The power switching circuit 110 shown in FIG. 4 includes a main power supply part 111, a backup power supply part 112, a system circuit 114 serving as a load, a reverse flow preventing diode D111, and a low voltage detecting circuit 113. The main power supply part 111 includes a main battery 121 and a first power supply circuit 122. The backup power supply part 112 includes a primary battery 131 and a second power supply circuit 132. The first power supply circuit 122 and the second power supply circuit 132 are configured to output substantially the same level of voltage.

In a case where the voltage of the main battery 121 is high, the operation of the second power supply circuit 132 of the backup power supply part 112 is shut down (stopped) by signals output from the low voltage detecting circuit 113. The second power supply circuit 132 operates only when the voltage of the main battery 121 becomes lower than a predetermined value. Therefore, even in a case where the system voltage V becomes temporarily low, no power is supplied to the system circuit 114 from the backup power supply part 112. Thereby, the primary battery 131 of the backup power supply part 112 can be prevented from being discharged.

In the power switching circuit 100 shown in FIG. 3, the voltage Vcc of the main power supply 101, which is output from the output terminal 103, is detected directly. Therefore, in a case where the voltage divided at the resistors R101 and R102 is near the output voltage of the reference voltage source 107, slight changes in the voltage Vcc of the main power supply 101 due to subtle changes of load cause the main power supply 101 and the backup power supply 102 to be switched frequently, that is, the voltage output from the output terminal 103 is frequently switched between main power supply voltage Vcc and backup power supply voltage VBAT. As a result, in a case where the output terminal 103 is connected to a load circuit, the load circuit is adversely affected by the frequent switching of voltage. In addition, since the power switching circuit 100 shown in FIG. 3 is configured to switch to the backup power supply 102 when the voltage Vcc of the main power supply 101 decreases to some level, the power switching circuit 100 cannot be used for applications where changes in the voltage of the output terminal 103 are required to be minimal.

The power switching circuit 110 shown in FIG. 4 includes the first power supply circuit 122 provided in the main power supply part 111 and the second power supply circuit 132 provided in the backup power supply part 112 in correspondence with the first power supply circuit 110. Furthermore, low voltage detection is performed at the main battery 121. Therefore, with this configuration, changes in the voltage of the system voltage V can be controlled to a low level even in a case where the main power supply part 111 and the backup power supply part 112 are switched back and forth. However, in a case where the second power supply circuit part 132 of the backup power supply part 112 is activated when the voltage of the main battery 121 becomes low, there is no countermeasure for preventing the current from flowing in from the backup power supply part 112 to the output terminal of the main power supply part 111. Therefore, the power switching circuit 110 is unable to prevent reverse flow of current from the backup power supply part 112 to the main power supply part 111. In addition, even after the second power supply circuit 132 of the backup power supply circuit part 112 is activated due to a drop in the voltage of the main battery 121, some amount of time is required for the second power supply circuit 132 to output a rated output voltage. Accordingly, the voltage of the system power supply V temporarily drops to a considerably low level, to thereby adversely affect the system circuit 114.

SUMMARY

In an aspect of this disclosure, there is provided a power supply circuit including: a first power supply for supplying a first power to a load; a first constant voltage circuit part for changing a voltage input from the first power supply to a first constant voltage and outputting the first constant voltage to the load; a first switch part for controlling the input of the first constant voltage to the load; a second power supply for supplying a second power to the loud; a second constant voltage circuit part for changing a voltage input from the second power supply to a second constant voltage and outputting the second constant voltage to the load; and a second switch part for controlling the input of the second constant voltage to the load.

In the above-mentioned power supply circuit, the power supply circuit may further include a control circuit part for detecting at least one of the input voltage and the output constant voltage of the first and second constant voltage circuit pans and controlling the first and second switch parts according to the result of the detection.

In the above-mentioned power supply circuit, the control circuit part may switch off the first switch part when the input voltage of the first constant voltage circuit part is less than a first predetermined voltage.

In the above-mentioned power supply circuit, the control circuit part may switch off the first switch part when the output voltage of the first constant voltage circuit is less than a second predetermined voltage which second predetermined voltage is less than the rated output voltage of the first constant voltage circuit.

In the above-mentioned power supply circuit, the control circuit part may switch off the second switch part when the input voltage of the second constant voltage circuit part is less than a third predetermined voltage.

In the above-mentioned power supply circuit, the control circuit part may switch off the second switch part when the output voltage of the second constant voltage circuit part is less than a fourth predetermined voltage which fourth predetermined voltage is less than the rated output voltage of the second constant voltage circuit part.

In the above-mentioned power supply circuit, the control circuit part may stop the first constant voltage circuit part when the input voltage of the first constant voltage circuit part is less than the first predetermined voltage.

In the above-mentioned power supply circuit, the control circuit part may stop the second constant voltage circuit part when the input voltage of the second constant voltage circuit part is less than a third predetermined voltage.

In the above-mentioned power supply circuit, the control circuit part may switch on the first switch pan after a first predetermined period elapses when the input voltage of the first constant circuit part is equal to or greater than the first predetermined voltage.

In the above-mentioned power supply circuit, the control circuit part may switch on the first switch part after a second predetermined period elapses when the output voltage of the first constant voltage circuit part is equal to or greater than the second predetermined voltage.

In the above-mentioned power supply circuit, the control circuit pan may switch on the second switch part after a third predetermined period elapses when the input voltage of the second constant voltage circuit part is equal to or greater than the third predetermined voltage.

In the above-mentioned power supply circuit, the control circuit part may switch on the second switch part after a fourth predetermined period elapses when the output voltage of the second constant voltage circuit part is equal to or greater than the fourth predetermined voltage.

In the above-mentioned power supply circuit, the first constant voltage output from the first constant voltage circuit part may be substantially equal to the second constant voltage output from the second constant voltage circuit pan.

In the above-mentioned power supply circuit, the first and second switch parts each may include a PMOS transistor having a substrate gate connected toward the load.

In the above-mentioned power supply circuit, the control circuit part may stop the load in a case of switching off both the first and second switch parts.

In the above-mentioned power supply circuit, the control circuit part may include a first detecting circuit for detecting at least one of the input voltage and the output voltage of the first constant voltage circuit part, a second detecting circuit for detecting at least one of the input voltage and the output voltage of the second constant voltage circuit part, and a control circuit for controlling the first and second switch parts according to the results of the detection of the first and second detecting circuits, wherein the control circuit is supplied with a power level equal to the power supplied to the load.

In the above-mentioned power supply circuit, the first power supply may include an AC adapter, wherein the second power supply may include a battery.

According to another aspect of this disclosure, by providing the first constant voltage circuit part between the first power supply and the first switch part, providing the second constant voltage circuit part between the second power supply and the second switch pan, detecting the input voltage and/or the output voltage of the first constant voltage circuit part, detecting the input voltage and/or the output voltage of the second constant voltage circuit part, and controlling the first and second switch pans according to the result of the detection, a constant voltage can be stably supplied to the load and voltage can be prevented from changing even when the first power supply and the second power supply are switched back and forth.

According to another aspect of this disclosure, by providing the first switch pan between the first constant voltage circuit part and the load and providing the second switch part between the second constant voltage circuit part and the load, current can be prevented from flowing in reverse.

According to another aspect of this disclosure, by detecting the input voltage and/or the output voltage of the first constant voltage circuit part, detecting the input voltage and/or the output voltage of the second constant voltage circuit part, and controlling the first and second switch parts according to the result of the detection, the control circuit part can selectively determine the priority in controlling the first and second switch pans in a case where each of the first and second power supplies is able to supply power to the load.

According to another aspect of this disclosure, since the control circuit part stops the operation of the first constant voltage circuit part when the input voltage of the first constant voltage part is less than the first predetermined voltage and stops the second constant voltage circuit part when the input voltage of the second constant voltage circuit part is less than the third predetermined voltage, consumption of power can be reduced.

According to another aspect of this disclosure, since the control circuit part switches on the first switch pail, after a first predetermined period elapses when the input voltage of the first constant circuit part is equal to or greater than the first predetermined voltage, switches on the first switch part after a second predetermined period elapses when the output voltage of the first constant voltage circuit pan is equal to or greater than the second predetermined voltage, switches on the second switch part after a third predetermined period elapses when the input voltage of the second constant voltage circuit part is equal to or greater than the third predetermined voltage, and switches on the second switch part after a fourth predetermined period elapses when the output voltage of the second constant voltage circuit part is equal to or greater than the fourth predetermined voltage, the power supply can be switched after the output voltages of the constant voltage circuit parts rise to a predetermined voltage so that output voltage can be prevented from changing upon switching back and forth the first and second power supplies.

According to another aspect of this disclosure, since the first constant voltage output from the first constant voltage circuit part is substantially equal to the second constant voltage output from the second constant voltage circuit part, output voltage can be prevented from changing upon switching back and forth the first and second power supplies.

According to another aspect of this disclosure, since the control circuit part stops the load in a case of switching off both the first and second switch parts, consumption of power can be prevented even in a case where power is supplied to the load via the parasitic diodes of the first and second switch parts when there is a drop of voltage in each of the first and second power supplies.

Other aspects, features and advantages will be apparent from the following detailed description when read in conjunction with the accompanying drawings.

BRIEF DESCRIPTION OF THE DRAWINGS

FIG. 2 is a table showing an example of the performance of the power supply circuit shown in FIG. 1;

DESCRIPTION OF THE PREFERRED EMBODIMENTS

In the following, embodiments of the present invention are described with reference to the accompanying drawings.

Figure 1:
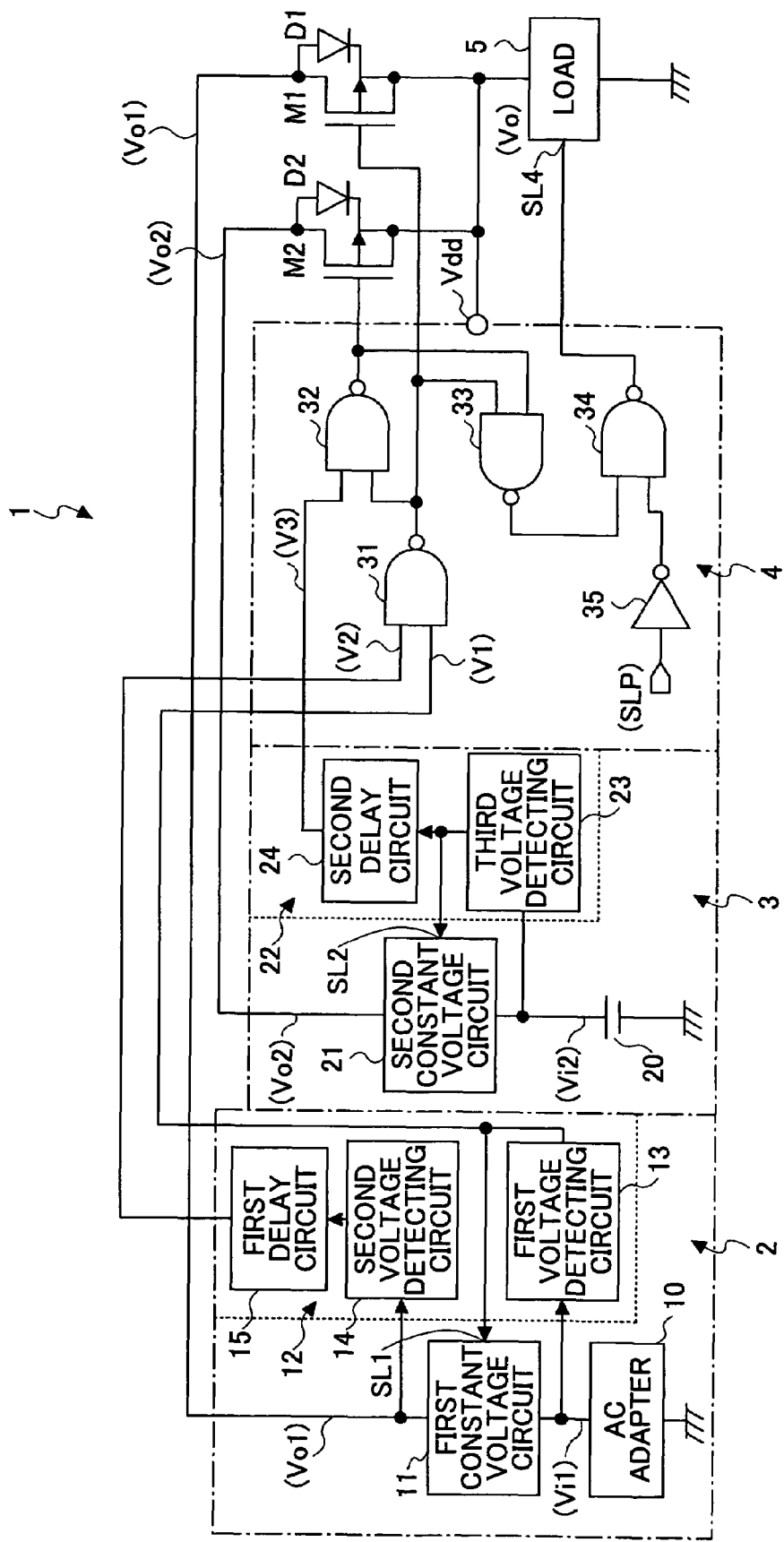
FIG. 1 is a circuit diagram showing an exemplary configuration of a power supply circuit according to the first embodiment of the present invention.
Figure 3:
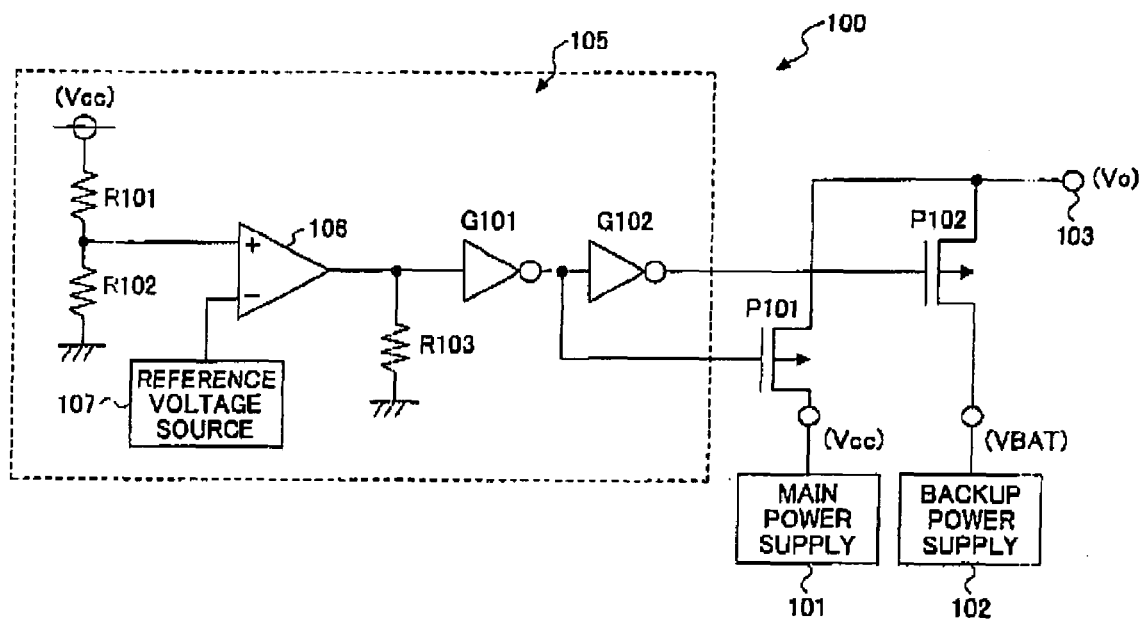
FIG. 3 is a circuit diagram showing a related art example of a power supply switching circuit.
Figure 4:
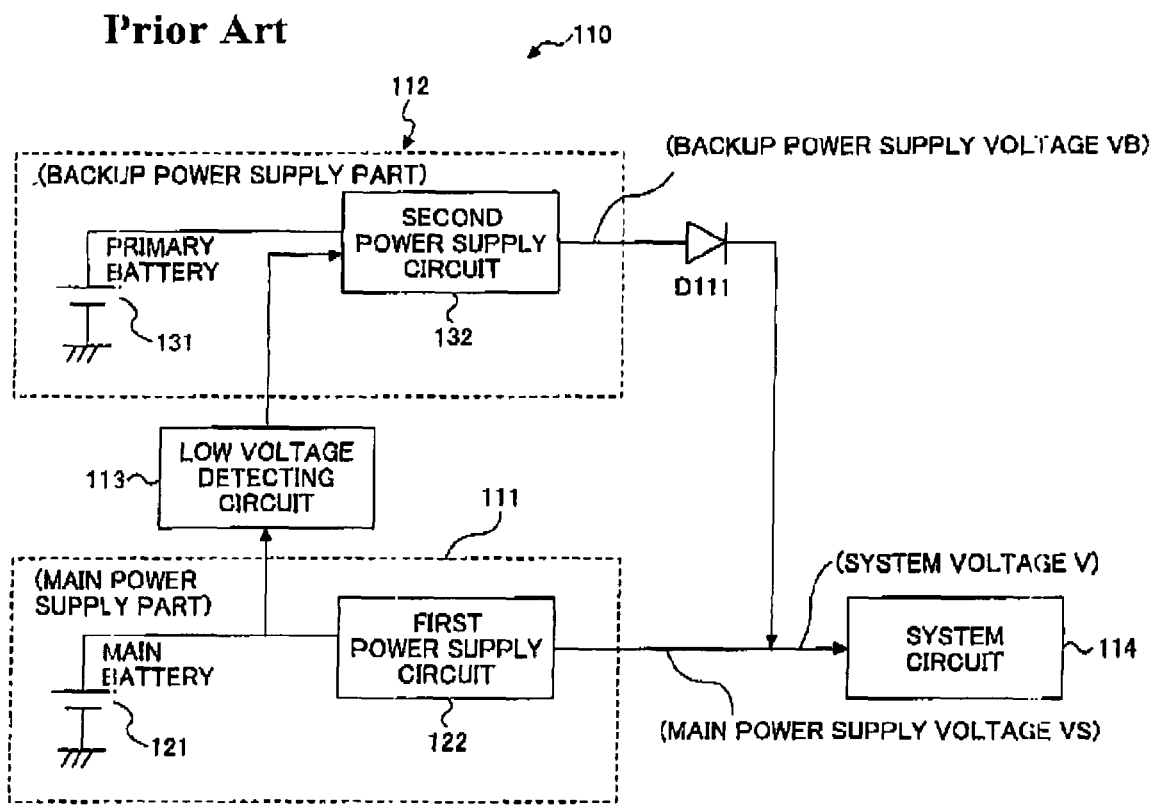
FIG. 4 is a circuit diagram showing another related art of a power supply switching circuit.

FIG. 1 is a circuit diagram showing an exemplary configuration of a power supply circuit 1 according to the first embodiment of the present invention.

The power supply circuit 1 shown in FIG. 1 includes a first power supply control circuit 2, a second power supply control circuit 3, a control circuit 4, a PMOS transistor M1 (i.e. first switch part), and a PMOS transistor M2 (i.e. second switch part). The drains corresponding to the PMOS transistors M1, M2 are connected. The connected part of the drains is connected to a load 5. In FIG. 1, D1 and D2, which are connected to the sources and the substrate gates of the PMOS transistors M1 and M2 respectively, indicate parasitic diodes of the PMOS transistors M1 and M2.

The first power supply control circuit 2 includes an AC adapter 10, a first constant voltage circuit 11, and a first detecting circuit 12. The first detecting circuit 12 includes first and second voltage detecting circuits 13, 14, and a first delay circuit 15. The voltage Vi1 output from the AC adapter 10 is input to the first constant voltage circuit 11 and the first voltage detecting circuit 13. The first voltage detecting circuit 13 compares the voltage Vi1 output from the AC adapter 10 with a detection voltage VD1 that is dedicated for voltage detection by the first voltage detecting circuit 13. In a case where the output voltage Vi1 is equal to or greater than the detection voltage VD1, the first voltage detecting circuit 13 outputs a signal V1 indicative of a high level to the control circuit 4. In a case where the output voltage Vi1 is less than the detection voltage VD1, the first voltage detecting circuit 13 outputs a signal V1 indicative of a low level to the control circuit 4. In addition, the signal V1 output from the first voltage detecting circuit 13 is also input to a sleep input terminal SL1.

The voltage Vo1 output from the first constant voltage circuit 11 is input to the load 5 via the PMOS transistor M1 and also input to the second voltage detecting circuit 14. The second voltage detecting circuit 14 compares the voltage Vo1 output from the first constant voltage circuit 11 with a detection voltage VD2 that is dedicated for voltage detection by the second voltage detecting circuit 14. In a case where the output voltage Vo1 is equal to or greater than the detection voltage VD2, the second voltage detecting circuit 14 outputs a signal V2 indicative of a high level to the control circuit 4 via the first delay circuit 15. In a case where the output voltage Vo1 is less than the detection voltage VD2, the second voltage detecting circuit 13 outputs a signal V2 indicative of a low level to the control circuit 4 via the first delay circuit 15.

The second power supply control circuit 3 includes a battery 20, a second constant voltage circuit 21, and a second detection circuit 22. The second detecting circuit 22 includes a third voltage detecting circuit 23 and a second delay circuit 24.

The voltage Vi2 output from the battery 20 is input to the second constant voltage circuit 21 and also input to the third voltage detecting circuit 23. The third voltage detecting circuit 23 compares the voltage Vi2 output from the battery 20 with a detection voltage VD3 that is dedicated for voltage detection by the third voltage detecting circuit 23. In a case where the output voltage Vi2 is equal to or greater than the detection voltage VD3, the third voltage detecting circuit 23 outputs a signal V3 indicative of a high level to a sleep terminal SL2 (serving to change the second constant voltage circuit 21 to a sleep state) and to the control circuit 4 via the second delay circuit 24. In a case where the output voltage Vi2 is less than the detection voltage VD3, the third voltage detecting circuit 23 outputs a signal V3 indicative of a low level to the sleep terminal SL2 and the control circuit 4 via the second delay circuit 24. Furthermore, the voltage Vo2 output from the second constant circuit 21 is also input to the load 5 via the PMOS transistor M2.

The control circuit 4 includes four NAND circuits 31-34 and an inverter 35. It is to be noted that the power supply of a logic circuit used for the control circuit 4 is the same power supply used for supplying power to the load 5.

The signal V1 output from the first voltage detecting circuit 13 is input to one of the input terminals of the NAND circuit 31, and the signal V2 output from the second voltage detecting circuit 14 via the first delay circuit 15 is input to the other one of the input terminals of the NAND circuit 31. The signal V3 output from the second delay circuit 24 is input to one of the input terminals of the NAND circuit 32, and a signal output from the NAND circuit 31 is input to the other one of the input terminals of the NAND circuit 32. The output terminal of the NAND circuit 31 is connected to a gate of the PMOS transistor M1, and the output terminal of the NAND circuit 32 is connected to a gate of the PMOS transistor M2.

The output terminal of the NAND circuit 31 is connected to one of the input terminals of the NAND circuit 33, and the output terminal of the NAND circuit 32 is connected to the other one of the input terminals of the NAND circuit 33. The output terminal of the NAND circuit 33 is connected to one of the input terminals of the NAND circuit 34, and the output terminal of the inverter 35 is connected to the other one of the input terminals of the NAND circuit 34. A sleep signal SLP, serving to change the load 5 to a sleep state, is input to the other input terminal of the NAND circuit 34 via the inverter 35. The output terminal of the NAND circuit 34 is connected to a sleep input terminal SL4 of the load 5.

Next, the performance of the power supply circuit 1 having the above-described configuration is described with reference to FIG. 2. FIG. 2 is a table showing an example of the performance of the power supply circuit 1 shown in FIG. 1. In the example shown in FIG. 2, the detection voltage VD1 of the first voltage detecting circuit 13 is 3.75 V, the detection voltage VD2 of the second voltage detecting circuit 14 is 2.5 V, the detection voltage VD3 of the third voltage detecting circuit 23 is 3.2 V, and the rated output voltage of each of the first and second constant voltage circuits 11, 21 is 2.85 V.

In a case where the conditions "A" in the table of FIG. 2 are applied, the output signal V1 of the first voltage detecting circuit 13 is a high level (true) since the voltage Vi1 output from the AC adapter 10 is equal to or greater than the detection voltage VD1 (3.75V). Furthermore, the output signal V2 of the second voltage detecting circuit 14 is also a high level (true) since the output voltage Vo1 of the first constant voltage circuit 11 is rated output voltage (2.85 V) if the output voltage Vi1 of the AC adapter 10 is equal to or greater than the detection voltage VD1 (3.75 V). With the conditions of "A", the PMOS transistor M1 is on and the PMOS transistor M2 is off regardless of the voltage of the battery 20. Thereby, power is supplied to the load 5 from the first constant voltage circuit 11.

The reason for having the first delay circuit 15 delay the output signal of the second voltage detecting circuit 14 is described below.

In a case where the first constant voltage circuit 11 is awakened from a sleep state when the AC adapter 10 is connected, some amount of time is required for the output voltage Vo1 of the first constant voltage circuit 11 to rise to a rated output voltage (2.85 V). Since the detection voltage VD2 (2.5 V) of the second voltage detecting circuit 14 is less than the rated output voltage (2.85 V) of the first constant voltage circuit 11, the output voltage Vo1 of the first constant voltage circuit 11 does not reach the rated output voltage (2.85 V) at the time when the second voltage detecting circuit 14 outputs a signal of a high level (true). Therefore, the first delay circuit 15 delays the output signal of the second voltage detecting circuit 14 for the time required for the output voltage Vo1 of the first constant voltage circuit 11 to rise from the detection voltage VD2 (2.5 V) to the rated output voltage (2.85). Accordingly, the signal V2 indicative of high level (true) can be output to the control circuit 4 when the output voltage Vo1 of the first constant voltage circuit 11 reaches the rated output voltage (2.85 V).

Next, in a case where the conditions "B" in the table of FIG. 2 are applied, the output voltage Vi1 of the AC adapter 10 becomes less than the detection voltage VD1 (3.75 V) and the output signal V1 of the first voltage detecting circuit 13 becomes a low level (false), or the output voltage Vo1 of the first constant voltage circuit 11 becomes less than the detection voltage VD2 (2.5 V) and the output signal V2 of the second delay circuit 15 becomes a low level (false). In addition, the voltage Vi2 of the battery 20 is equal to or greater than the detection voltage VD3 (3.2 V) and the output signal V3 of the third voltage detecting circuit 23 becomes a high level (true). With the conditions of "B", the PMOS transistor M1 is switched off and the PMOS transistor M2 is switched on in a case where the voltage Vi2 of the battery 20 is sufficiently high and the AC adapter 10 is in a disconnected state. Thereby, power is supplied to the load 5 from the second constant voltage circuit 21. Although the example of applying conditions "B" is described in a case where the output signals V1 and V2 are both low level (false), the PMOS transistor M1 is switched off and the PMOS transistor M2 is switched on when either one of the output signals V1, V2 is a low level (false).

The reason for having the second delay circuit 24 delay the output signal of the third voltage detecting circuit 23 is the same as the reason for providing the above-described first delay circuit 15. That is, in a case where the second constant voltage circuit 21 is awakened from a sleep state when the battery 20 is connected, some amount of time is required for the output voltage Vo2 of the second constant voltage circuit 21 to rise to a rated output voltage (2.85 V). Therefore, the second delay circuit 24 delays the output signal of the third voltage detecting circuit 23 for the time required for the output voltage Vo2 of the second constant voltage circuit 21 to rise to the rated output voltage (2.85). Accordingly, the signal V3 indicative of high level (true) can be output to the control circuit 4 when the output voltage Vo2 of the second constant voltage circuit 21 reaches the rated output voltage (2.85 V). It is to be noted that, in a case where the output voltage Vi1 of the AC adapter 10 is less than the detection voltage VD1 (3.75 V) and the output signal V1 of the first voltage detecting circuit 13 becomes a low level (false), the output signal V1 is also output to the sleep input terminal SL1 of the first constant voltage circuit 11. This allows the operation of the first constant voltage circuit 11 to be stopped, and reduces the consumption of power.

Next, similar to the case of applying the conditions "B", in a case where the conditions "C" of FIG. 2 are applied, the output voltage Vi1 of the AC adapter 10 becomes less than the detection voltage VD1 (3.75 V)

or the output voltage Vo1 of the first constant voltage circuit 11 becomes less than the detection voltage VD2 (2.5 V). In this case, however, the voltage Vi2 of the battery 20 is less than the detection voltage VD3 (3.2 V). Therefore, the output signal V3 of the third voltage detecting circuit 23 becomes a low level (false). With the conditions of "C", both PMOS transistors M1 and M2 are switched off and the supplying of power to the load 5 is stopped in a case where the voltage Vi2 of the battery 20 is low and the AC adapter 10 is in a disconnected state. It is to be noted that, in a case where the output voltage Vi2 of the battery 20 is less than the detection voltage VD3 (3.2 V) and the output signal V3 of the third voltage detecting circuit 23 becomes a low level, the output signal V3 is also output to the sleep input terminal SL2 of the second constant voltage circuit 21. This allows the operation of the second constant voltage circuit 21 to be stopped, and reduces the consumption of power.

Furthermore, in the case of applying the conditions of "C", the signal output from the output terminal of the NAND circuit 33 becomes a low level since both input terminals of the NAND circuit 33 are high level. The level of the signal output from the NAND circuit 33 is reversed by the NAND circuit 34. Therefore, the signal output from the NAND circuit 34 to the sleep input terminal SL4 of the load 5 becomes a high level. As a result, the load 5 becomes a sleep state. As shown in the conditions "D" of FIG. 2, the load 5 can also become switched to a sleep state when a sleep signal SLP of a high level is input to the input terminal of the inverter 35 (which is the sleep input terminal of the control circuit 4). Although the conditions "B" and "C" are described above with a case of having the AC adapter 10 in a disconnected state, other cases may also be applied such as a case where the AC adapter has malfunctioned, or where an AC adapter of another standard is used.

With the power supply circuit 1 according to an embodiment of the present invention, no reverse flow of current occurs since both the first and second constant voltage circuits 11, 21 respectively output the rated output voltage (2.85 V). Furthermore, even in a case where the output voltage Vo2 of the second constant voltage circuit 21 has not reached the rated output voltage (2.85 V), no reverse flow will occur since the PMOS transistor M1 is switched off.

In the case where the conditions of "C" are applied, no reverse current occurs since the PMOS transistor M2 is switched off. In this case, however, power is supplied to the load 5 from the first constant voltage circuit 11 via the parasitic diode D1 of the PMOS transistor M1. Nevertheless, in the case of applying the conditions "C", the load 5 is switched to a sleep state by a sleep signal of high level output from the control circuit 4 to the load 5. Therefore, even when voltage Vo1 is applied to the load 5, the power can be prevented from being consumed. As a result, unnecessary consumption of power can be prevented. Furthermore, since the control circuit 4 and the load 5 use the same power supply, the control circuit 4 operates only when power is supplied to the load 5. Thereby, unnecessary consumption of power can be prevented.

Although the power supply circuit 1 shown in FIG. 1 is configured having the first and second voltage detecting circuits 13, 14 provided in the first power supply control circuit 2 for detecting both input voltage and output voltage of the first constant voltage circuit 11 and having the third voltage detecting circuit 23 provided in the second power supply control circuit 3 for detecting the input voltage of the second constant voltage circuit 21, the power supply circuit of the present invention is not limited to the configuration shown in FIG. 1. That is, the power supply circuit of the present invention may have other configurations.

For example, in another configuration of the power supply circuit 1, a single voltage detecting circuit may be provided in the first power supply control circuit 2 for detecting only the voltage Vi1 input to the first constant voltage circuit 11, and two voltage detecting circuits may be provided in the second power supply control circuit 2 for detecting both input voltage Vi2 and output voltage Vo2 of the second constant voltage circuit 21.

In another configuration of the power supply circuit 1, a single voltage detecting circuit may be provided in each of the first and second power supply control circuits for detecting the input or output voltage of a constant voltage circuit. In another configuration of the power supply circuit 1, two voltage detecting circuits may be provided in each of the first and second power supply control circuits for detecting both input and output voltages of a constant voltage circuit. Furthermore, although the power supply circuit 1 shown in FIG. 1 is configured to input sleep signals to the sleep input terminals of the first and second constant voltage circuits 11 and 21 from corresponding first and third voltage detecting circuits 13 and 23, the input of the sleep signals may be omitted.

The above-described power supply circuit 1 according to the first embodiment of the present invention has a configuration in which the first constant voltage circuit 11 that outputs a predetermined constant voltage is provided between the AC adapter 10 and the PMOS transistor M1, the second constant voltage circuit 21 that outputs a constant voltage equal to that of the first constant voltage circuit 11 is provided between the battery 20 and the PMOS transistor M2, and the PMOS transistors M1 and M2 are selectively switched on and off by the control circuit 4. With such a configuration, the power supply circuit 1 according to the first embodiment of the present invention can prevent current from flowing in reverse from one power supply to another power supply and provide a stable high voltage to the load.

Further, the present invention is not limited to these embodiments, but variations and modifications may be made without departing from the scope of the present invention.

The present application is based on Japanese Priority Application No. 2005-234172 filed on Aug. 12, 2005, with the Japanese Patent Office, the entire contents of which are hereby incorporated by reference.

What is claimed is:

1. A power supply circuit comprising:
a first power supply for supplying a first power voltage to a load;
a first constant voltage circuit part for changing the first power voltage input from the first power supply to a first constant voltage and outputting the first constant voltage to the load;
a first switch part for controlling the input of the first constant voltage to the load;
a second power supply for supplying a second power voltage to the load;
a second constant voltage circuit part for changing the second power voltage input from the second power supply to a second constant voltage and outputting the second constant voltage to the load;
a second switch part for controlling the input of the second constant voltage to the load; and
a control circuit part for detecting at least one of the input voltage and the output constant voltage of the first and second constant voltage circuit parts and controlling the first and second switch parts according to the result of the detection,
wherein the first power voltage is a DC voltage, wherein the first constant voltage circuit part is configured to change the DC first power voltage input from the first power supply to the first constant voltage;
wherein the second power voltage is a DC voltage, wherein the second constant voltage circuit part is configured to change the DC second power voltage input from the second power supply to the second constant voltage,
wherein the first switch part is switched off when the first power voltage is less than a first predetermined voltage value, and the second switch part is switched off when the second power voltage is less than a third predetermined voltage value, wherein the control circuit part switches off the first switch part when the input voltage of the first constant voltage circuit part is less than said first predetermined voltage, wherein the control circuit part switches off the first switch pail when the output voltage of the first constant voltage circuit is less than the second predetermined voltage, where the second predetermined voltage is less than the rated output voltage of the first constant voltage circuit, and wherein the second switch part is switched off when the input voltage of the first constant voltage circuit part is equal to or greater than the first predetermined voltage and the output voltage of the first constant voltage circuit part is equal to or greater than a second predetermined voltage.

2. The power supply circuit as claimed in claim 1, wherein the control circuit part switches off the second switch part when the input voltage of the second constant voltage circuit part is less than said third predetermined voltage.

3. The power supply circuit as claimed in claim 2, wherein the control circuit part switches off the second switch part when the output voltage of the second constant voltage circuit part is less than a fourth predetermined voltage, where the fourth predetermined voltage is less than the rated output voltage of the second constant voltage circuit part.

4. The power supply circuit as claimed in claim 1, wherein the control circuit part stops the first constant voltage circuit part when the input voltage of the first constant voltage circuit part is less than the first predetermined voltage.

5. The power supply circuit as claimed in claim 1, wherein the control circuit part stops the second constant voltage circuit part when the input voltage of the second constant voltage circuit part is less than the third predetermined voltage.

6. The power supply circuit as claimed in claim 1, wherein the control circuit part switches on the first switch part after a first predetermined period elapses when the input voltage of the first constant circuit part is equal to or greater than the first predetermined voltage.

7. The power supply circuit as claimed in claim 1, wherein the control circuit part switches on the first switch part after a second predetermined period elapses when the output voltage of the first constant voltage circuit part is equal to or greater than the second predetermined voltage.

8. The power supply circuit as claimed in claim 2, wherein the control circuit part switches on the second switch part after a third predetermined period elapses when the input voltage of the second constant voltage circuit part is equal to or greater than the third predetermined voltage.

9. The power supply circuit as claimed in claim 3, wherein the control circuit part switches on the second switch pan after a fourth predetermined period elapses when the output voltage of the second constant voltage circuit part is equal to or greater than the fourth predetermined voltage.

10. The power supply circuit as claimed in claim 1, wherein the first constant voltage output (torn the first constant voltage circuit part is substantially equal to the second constant voltage output from the second constant voltage circuit part.

11. The power supply circuit as claimed in claim 1, wherein the first and second switch parts each include a PMOS transistor having a substrate gate connected toward the load.

12. The power supply circuit as claimed in claim 1, wherein the control circuit part stops the load in a case of switching off both the first and second switch parts.

13. The power supply circuit as claimed in claim 1, wherein the control circuit part includes a first detecting circuit for detecting at least one of the input voltage anti the output voltage of the first constant voltage circuit pan, a second detecting circuit for detecting at least one of the input voltage and the output voltage of the second constant voltage circuit parts and a control circuit thr controlling the first and second switch parts according to the results of the detection of the first and second detecting circuits, wherein the control circuit is supplied with a power level equal to the power supplied to the load.

14. The power supply circuit as claimed in claim 1, wherein the first power supply includes an AC adapter, wherein the second power supply includes a battery.

\* \* \* \* \*